US007428423B2

(12) United States Patent
Vilmur et al.

(10) Patent No.: US 7,428,423 B2
(45) Date of Patent: *Sep. 23, 2008

(54) COMMUNICATION SYSTEM WITH CONTROLLED TALK AROUND MODE

(75) Inventors: Roger M. Vilmur, Palatine, IL (US); James K. Gehrke, Lake in the Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 240 days.

This patent is subject to a terminal disclaimer.

(21) Appl. No.: 11/313,144

(22) Filed: Dec. 19, 2005

(65) Prior Publication Data

US 2006/0111117 A1 May 25, 2006

(51) Int. Cl.
    *H04B 7/00* (2006.01)
(52) U.S. Cl. ........................ 455/519; 455/518; 455/513; 455/522
(58) Field of Classification Search ................ 455/513, 455/524, 63, 502, 518, 519, 69, 522, 54.2, 455/445, 517; 370/203, 337
    See application file for complete search history.

(56) References Cited

U.S. PATENT DOCUMENTS

| 5,040,238 | A | 8/1991 | Comroe et al. |
| 5,423,055 | A | 6/1995 | Diaz et al. |
| 5,493,695 | A | 2/1996 | Aitkenhead |
| 5,737,325 | A | 4/1998 | Fukuda |
| 5,822,682 | A | 10/1998 | Schroderus et al. |
| 5,901,342 | A | 5/1999 | Heiskari et al. |
| 5,960,360 | A | 9/1999 | Carmon et al. |
| 5,995,500 | A * | 11/1999 | Ma et al. ..................... 370/337 |
| 6,041,226 | A * | 3/2000 | Skoro et al. .................. 455/405 |
| 6,091,939 | A | 7/2000 | Banh |
| 6,292,671 | B1 | 9/2001 | Mansour |
| 6,370,369 | B1 | 4/2002 | Kraiem et al. |
| 6,415,146 | B1 | 7/2002 | Capece |
| 6,532,369 | B1 * | 3/2003 | Myer .......................... 455/517 |
| 6,549,778 | B1 | 4/2003 | Mulford |
| 6,684,080 | B1 | 1/2004 | Barnes et al. |
| 6,795,424 | B1 * | 9/2004 | Kapoor et al. ............... 370/343 |
| 7,010,313 | B2 * | 3/2006 | Vilmur et al. ............... 455/513 |
| 2002/0105928 | A1 * | 8/2002 | Kapoor et al. ............... 370/334 |
| 2003/0002594 | A1 | 1/2003 | Harel et al. |
| 2003/0144003 | A1 | 7/2003 | Ranta |

FOREIGN PATENT DOCUMENTS

EP          001063785 A1      12/2000

* cited by examiner

*Primary Examiner*—Tan Trinh
(74) *Attorney, Agent, or Firm*—Valerie M. Davis

(57) ABSTRACT

The method provides talk around in an OFDMA communication system by sending a talk around request from a subscriber unit to a base unit. At the subscriber unit a RSSI (received signal strength indication) of a signal received from the base unit is determined and sent back to the base unit, in the base unit the RSSI is compared to a predetermined window, if the RSSI is above the window, the request from the subscriber unit is denied, if the RSSI is within the window, a sub-channel of the OFDMA communication system and a power level are assigned to the subscriber unit, the subscriber unit thereby going into talk around mode, if the RSSI is below the window, the subscriber unit does not respond and the subscriber unit goes into a direct communication mode independent of the OFDMA communication system.

10 Claims, 4 Drawing Sheets

COMMUNICATION SYSTEM WITH CONTROLLED TALK AROUND MODE

CROSS-REFERENCE TO RELATED APPLICATION

This application is a continuation-in-part of co-pending U.S. patent application Ser. No. 09/906,493, filed Jul. 16, 2001, of the same title.

FIELD OF THE INVENTION

The present invention relates generally to communication systems, and in particular, trunking systems in which a large number of users or subscriber units share a relatively small number of communication paths.

BACKGROUND

Commercial telephone communications, such as public safety systems, are a wireless version of trunking. This sharing of communication paths is managed automatically by a computer and channel selections, and other decisions normally made by the radio user are made by the central controller in the computer. Typically, channel assignment is automatic and completely transparent to an individual user. Trunking offers many benefits, including faster system access, better channel efficiency, and more user privacy and the flexibility to expand. Because of its flexibility, a trunked system can expand to accommodate a growing number of users and restructuring of talk groups. By using trunking the users need not share a common radio frequency channel and compete for air time.

In VHF and UHF frequency ranges trunking efficiency does not exist since there is one licensed frequency and one set of users for a given communication network. In this type of systems users cannot share the frequency channel, as users can in a trunking system. However, the FCC (Federal Communication Commission) has now permitted that a single channel (which is 25 kHz) can be broken into four 6.25 kHz channels. This now allows a user with a 25 kHz channel license to break it into four channels by using trunking. A desirable feature in trunking systems is talk around, which does not require a user to communicate via the trunking system. Talk around is the ability of two subscriber units to directly talk to one another without going through the communication network. Talk around is necessary when either one or both of the subscriber units is outside a coverage area of the communication network. It is to be understood that the coverage area of the communication network is that area in which the subscriber units can communicate with a base unit. Areas in which the subscriber unit cannot communicate with the base unit would occur at a predetermined distance away from the base unit and its transmitter tower, and within areas where the signal is blocked even though these areas may be close to the base unit. For example, this can occur inside of buildings and other structures.

In newer 800 MHz communication systems, a number of channels have been set aside for the use of talk around. But these channels are shared by all users of the frequency band making channel availability a problem. Also, in the older UHF and VHF communication systems, there is no provision for separate channels to handle talk around.

Thus, there exists a need in the art for a system which can provide talk around without using a separate dedicated channel. It is a drawback to the prior systems that when talk around is allowed on the regular frequency channels that are being used by other subscriber units, the talk around subscriber units cause interference, and can actually bring down the entire communication network.

BRIEF DESCRIPTION OF THE DRAWINGS

The invention may best be understood by reference to the following description taken in conjunction with the accompanying drawings, in the several figures of which like reference numerals identify like elements.

DETAILED DESCRIPTION

In general terms, the present invention is a communication network having a trunk composed of a plurality of frequency channels. A base unit communicates over the communication network with a plurality of subscriber units. The communication network has a coverage area in which signals from the subscriber units are not blocked to the base unit. A power control system is in the base unit for controlling a transmission power level of a subscriber unit operating in the talk around mode. Another power control system is in the subscriber unit for controlling transmission power thereof when the subscriber unit is in the talk around mode. The base unit controls at least the transmission power level of the subscriber unit such that interference with operation of the network is prevented when the subscriber unit is operating in the talk around mode.

Figure 1:
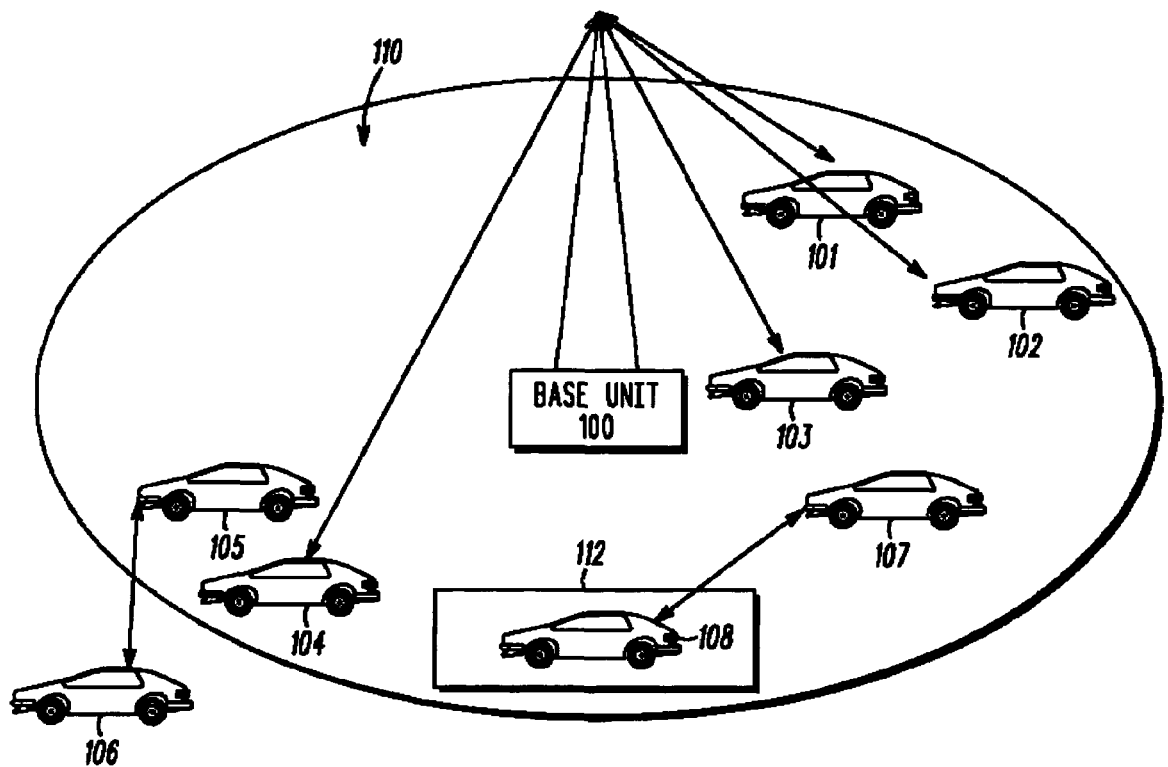
FIG. 1 is a schematic representation of a communication system having a plurality of subscriber units.

FIG. 1 depicts a base unit 100 which is potentially in communication with a plurality of subscriber units 101-108 to form a communication network. The communication network has a coverage area 110. Within the coverage area 110 the subscriber units are able to communicate with the base unit. FIG. 1 shows a subscriber unit 106 which is outside the coverage area 110, and therefore the subscriber unit 106 cannot communicate with the base unit 100. Also in FIG. 1, subscriber unit 108 cannot communicate with the base unit 100 because it is within an area 112 which is outside of the coverage area 110. It is to be understood that the coverage area 110 refers to those areas in which subscriber units are able to communicate with the base unit. For example, the area 112 may be inside a building where signals are blocked to the base station 100. Subscriber units 101 and 102, which are within the coverage area 110, can communicate with one another via the network which is controlled by the base unit 100. Similarly, subscriber units 103 and 104 can also communicate with one another through the communication network controlled by the base unit 100. As is known in operation of trunking systems, a subscriber unit is assigned to a frequency channel that it uses when communicating.

Figure 2:
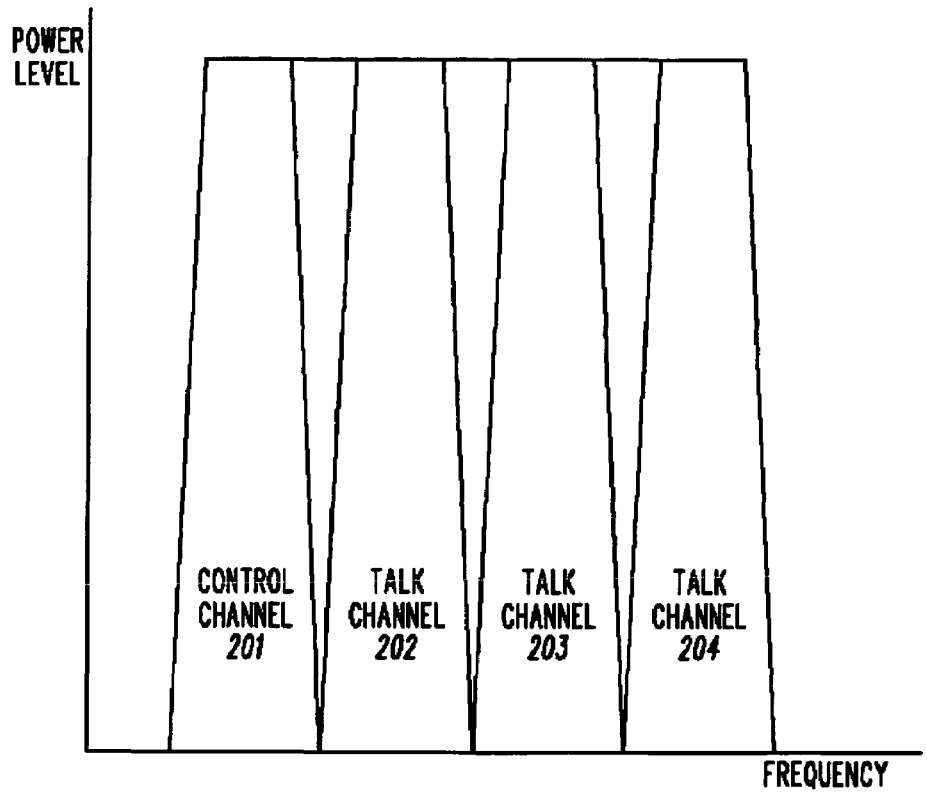
FIG. 2 is a diagram depicting the frequency channels of the communication network according to the present invention.

As shown in FIG. 2, in the UHF and VHF frequency ranges, trunking is implemented when the normal 25 kHz frequency channel is divided into four 6.25 kHz frequency channels 201, 202, 203 and 204. In the communication network one of those channels, such as channel 201, is assigned to be the control channel, and the other three channels 202, 203 and 204 are talk channels. For example, the subscriber units 102 and 101 may be assigned to talk channel 203 while at the same time subscriber units 103 and 104 are assigned to channel 203. Because of the distances between the subscriber units, the interference between the conversations is low or negligible.

In the situation where subscriber unit 105 desires to communicate with subscriber unit 106, which is outside of the coverage area 110 but 105 remains within the coverage area 110, it communicates with the base unit 100 which determines that the subscriber unit 105 may go into a talk around mode based on potential interference with other users. In addition the bases knowledge of talk around use and channel usage helps it prevent interference. The base unit 100 must then assign the conversation of the subscriber units 105 and 106 to one of the talk channels 202, 203 and 204. In order to minimize interference with the network, the base station 100 will assign the subscriber unit 105 to talk channel 204 which is furthest away from the control channel 201. Furthermore, the base unit 100 controls the transmission power of subscriber unit 105 such that interference is prevented in the network and prevented between subscriber unit 105 and, for example, subscriber 104 (presuming that subscriber 104 has been assigned to talk channel 204). In the talk around mode, the subscriber unit 105 communicates directly to the subscriber unit 106 by moving its transmitter to the base transmitter frequency for channel 201 and sending a codeword calling 106 and assigning it to a voice channel chosen by base station 100 in the same way the base would do it if in range. On receiving the control channel outbound frequency instructions from 105, radio 106 (or a group of radios 106a to 106n) will move into the same power level control talk around mode as 105.

In the situation where subscriber unit 105 desires to communicate with subscriber unit 106, which is outside of the coverage area 110 and 105 is also coverage area 110, it is not able to communicate with the base unit 100. In this condition the base cannot support the determination that the subscriber unit 105 may go into a talk around mode but the lack of base signal indicates a minimum potential interference with other users. Unit 105 will first search for an unused one of the talk channels 202, 203 and 204. In order to minimize interference with the network unit 105 first try talk channel 204 which is furthest away from the control channel 201. Furthermore, subscriber unit 105 will self control the transmission power of its transmitter to the maximum talk around level such that interference is prevented in the network and prevented between subscriber unit 105 and, for example, subscriber 104 (presuming that subscriber 104 has been assigned to talk channel 204). In the talk around mode, the subscriber unit 105 communicates directly to the subscriber unit 106 sending a talk around and voice channel assignments to 106. On receiving the call from 105, radio 106 (or a group of radios 106a to 106n) will move into the same power level control talk around mode as 105 on the unused channel 105 selected.

Similarly, subscriber units 107 and 108 may need to talk to each other, but subscriber unit 108 is in a location where the radio signals to the base unit 100 are blocked. Since subscriber unit 108 is in the area 112 which is not part of the coverage area 110, if subscriber unit 107 then requests to be placed into a talk around mode by the base unit 100. When the request is granted, the base unit 100 then assigns subscriber unit 107 to one of the talk channels which is farthest from the control channel and also controls the transmission power level of the subscriber 107 so as to prevent interference in the communication network. Thus, this method of the present invention preserves the system integrity of the communication network. In the situation where subscriber unit 107 desires to communicate with subscriber unit 108, which is outside of the coverage area 110 but 107 remains within the coverage area 110, it communicates with the base unit 100 which determines that the subscriber unit 107 may go into a talk around mode based on potential interference with other users. In addition the bases knowledge of talk around use and channel helps it prevent interference. The base unit 100 must then assign the conversation of the subscriber units 107 and 108 to one of the talk channels 202, 203 and 204. In order to minimize interference with the network, the base station 100 will assign the subscriber units to talk channel 204 which is furthest away from the control channel 201. Furthermore, the base unit 100 controls the transmission power of subscriber units 107 and 108 such that interference is prevented in the network and prevented between subscriber unit 107 and, for example, subscriber 103 (presuming that subscriber 104 has been assigned to talk channel 203). In the talk around mode, the subscriber unit 107 communicates directly to the subscriber unit 108 sending instructions to 108 and assigning it to a voice channel chosen by base station 100 in the same way the base would do if in range. On receiving the control channel outbound frequency instructions from 107, radio 108 (or a group of radios 108a to 108n) will move into the same power level control talk around mode as 107.

Figure 3:
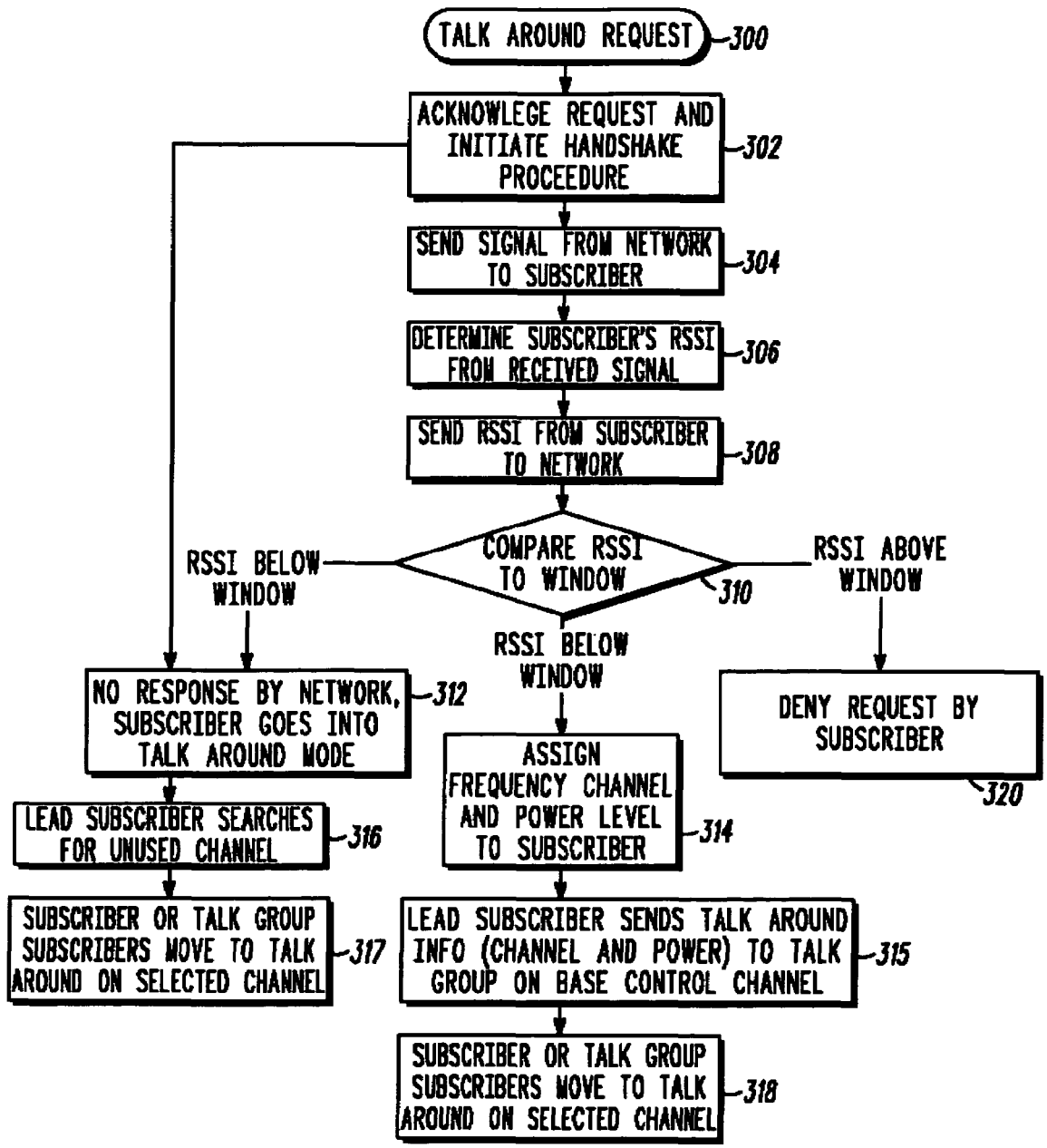
FIG. 3 is a flow diagram depicting the method of the present invention.
Figure 4:
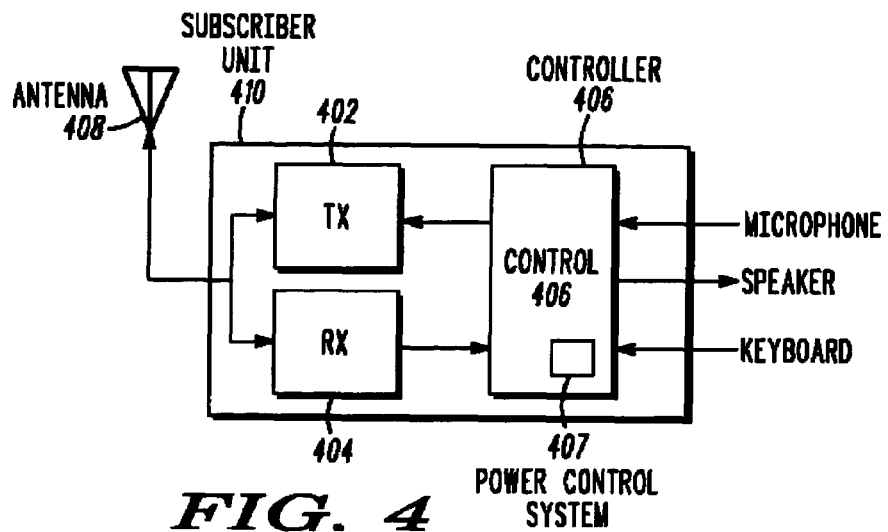
FIGS. 4 and 5 depict in block diagram form a subscriber unit and a base unit, respectively, according to the present invention.
Figure 5:
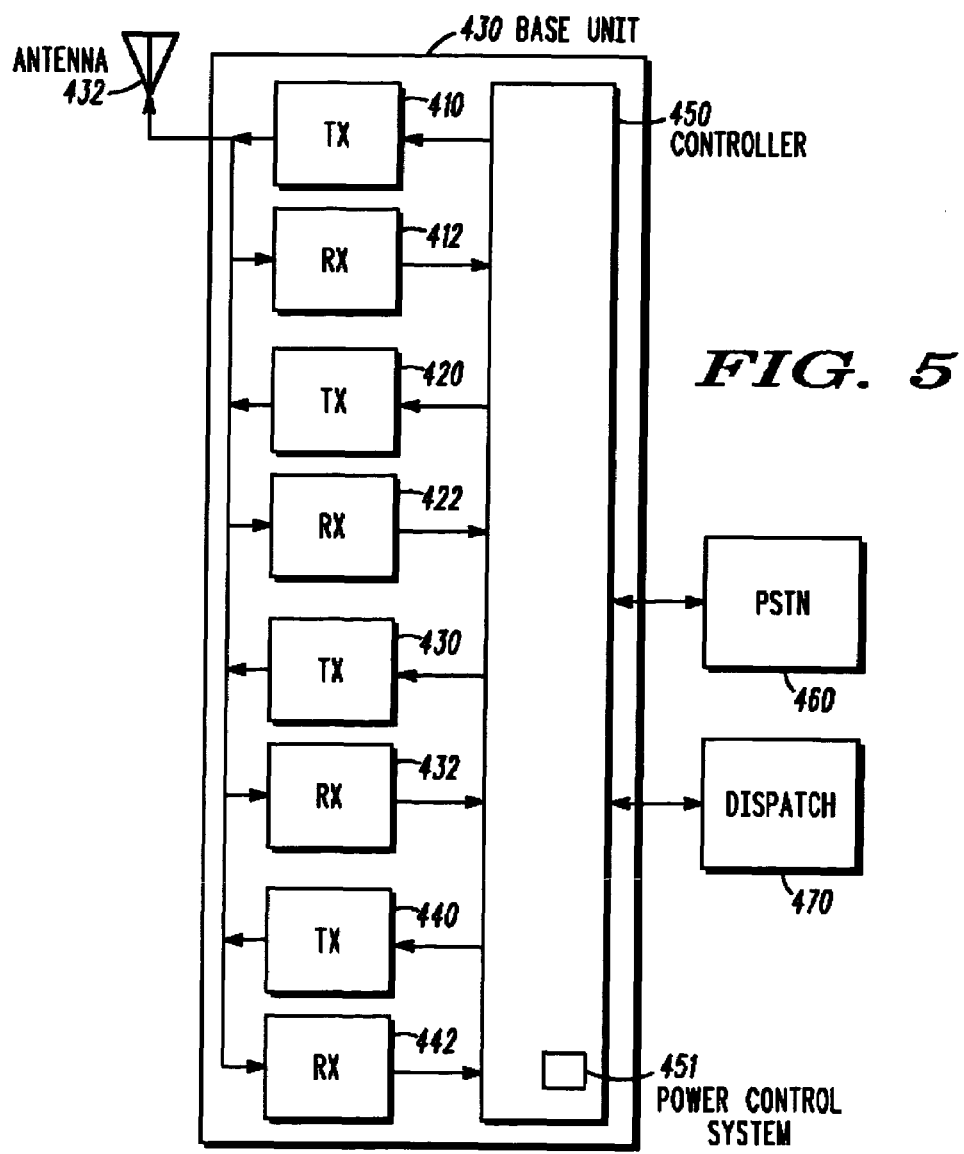

FIG. 3 is a flow diagram depicting the method of the present invention, and FIGS. 4 and 5 are block diagrams depicting the subscriber unit in FIG. 4 and the base unit in FIG. 5. The subscriber unit 410 in FIG. 4 has a transmitter 402 and a receiver 404 connected to an antenna 408. The transmitter 402 and the receiver 404 are operatively connected to a controller 406 which in turn is connected to a microphone 411, a speaker 412 and a keyboard 413. Within the controller 406, is a power control system 407 which incorporates the present invention. As shown in FIG. 5, the base unit 430 has an antenna 432 which is operationally connected to four sets of transmitters 410, 420, 430 and 440 and receivers 412, 422, 432 and 442. Each of these pairs of transmitters and receivers is for each of the four frequency channels in the communication network. It is to be understood, of course, that communication networks can exist and incorporate the present invention which have more or less than four pairs of transmitters receivers and corresponding frequency channels. Each of the pairs of transmitters and receivers are operationally connected to a controller 450, which includes a power control system 451 for implementing the present invention. The controller 450 is also connected with a public service telephone network 460 and/or a dispatch center 470. The power control system 407, 451 is implemented in software, although it is, of course, within the realm of the present invention for the power control system to be implemented in hardware or a combination of software and hardware. The power control system would base its power control instructions on received signal strength of the subscriber taken buy the base receiver and by other subscriber receivers also assigned to the same frequency as the talk around channel during that conversation.

As depicted in FIG. 3, in a first step of the method of the present invention, a subscriber unit forwards a talk around request to the base unit (step 300). In step 302 the base unit acknowledges the request from the subscriber unit and initiates a hand shake procedure. If the base is unable to acknowledge the request the system would move to step 312. In step 304 the base unit sends a signal to the subscriber unit. In response to this signal the subscriber unit forms an RSSI (received signal strength indication) of the signal received from the base unit. This RSSI is then sent from the subscriber unit back to the base unit. At the base unit the RSSI is compared to a predetermined window. If the RSSI is above the predetermined window of signal strength levels, then the request from the subscriber unit is denied. The subscriber unit is therefore not allowed to go into the talk around mode. If the RSSI, however, falls within the window of signal strength levels, then a frequency channel and power level are assigned to the subscriber unit and the subscriber unit is then placed into talk around mode. It is to be known that while in talk around mode the base unit can periodically change the frequency channel assigned to the subscriber as well as change the power level of the subscriber unit. Also other subscribers would report interference signal strength of the talk around group to the base to assist this monitoring and control. If the RSSI is below the predetermined window, then the subscriber unit does not receive a response from the base unit and the subscriber unit is then free to go into a direct communication mode with another subscriber unit which is independent of the communication system. It would first scan for usage on the voice channels and when an unused one is found, direct the talk around group to go to that channel.

The communication system is a frequency division multiple access system which, as explained above, has a predetermined number of channels. In the case of the UHF/VHF range, the communication system typically will have four channels, each being a 6.25 kHz channel. The power level assigned to a talk around subscriber is at a level reduced from a level of a network subscriber unit using the assigned channel of the talk around subscriber unit. Thus, the power levels are assigned such that the talk around subscriber unit does not substantially interfere with other network subscriber units. As explained above, the talk around subscriber unit will occupy a common channel with other subscriber units using the network. Furthermore, the network system will assign a channel to the talk around subscriber unit which is removed from the control channel so that interference with network operation is prevented by transmission of the talk around subscriber unit.

An embodiment of the present invention could also work with other types of sub-band based access protocols such as orthogonal frequency division multiple access (OFDMA). As is known to one of ordinary skill in the art, an OFDMA system may be considered to be a subset of an FDMA system, such as described above. As such, a control channel of an FDMA system may function as a control time slot of the OFDMA system. Further, control signaling may be performed similarly to the method performed in an FDMA system. As is further known to one of ordinary skill in the art, in an OFDMA system, subscriber units may receive information on multiple sub-channels and/or time slots and as such, the subscriber units may be able to achieve higher data rates.

Figure 6:
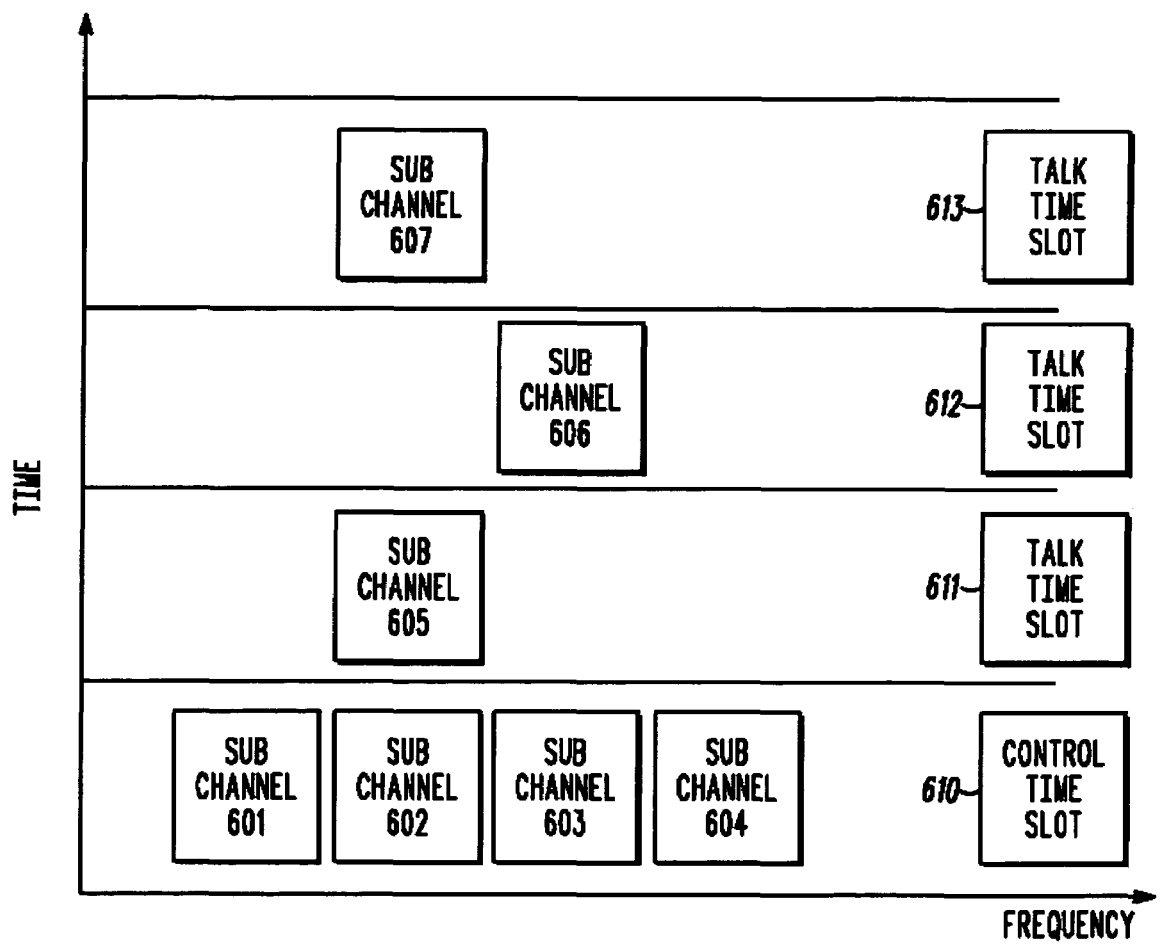
FIG. 6 is a diagram depicting time slots and sub-channels of an OFDMA communication network according to the present invention.

In any case, an embodiment of the present invention is described with reference to FIG. 6. Shown in FIG. 6 is a diagram depicting the time slots and sub-channels of an OFDMA trunking system in the UHF frequency range. In the OFDMA system of FIG. 6, there are four time slots where each time slot is divided into four sub-channels. In FIG. 6, the four time slots are allocated as three talk time slots 610-613 and one control time slot 610. Further, the time slot 610 is used for control signaling and is divided into four sub-channels, namely 601, 602, 603, and 604. Each talk time slot 610-613 is used for talk communications and is divided into sub-channels, e.g. 605-607, albeit only three sub-channels are shown. As is known to one of ordinary skill in the art, an OFDMA system may be divided into any number of time slots, e.g. twelve time slots, and any number of sub-channels, e.g. six sub-channels.

In operation and with reference to FIG. 1, the subscriber units 101 and 102 may be assigned to sub-channel 605 while at the same time subscriber units 103 and 104 are assigned to sub-channel 606, so that interference between the conversations is low or negligible. Further, in the situation where subscriber units 107 and 108 may need to talk to each other, but subscriber unit 108 is in a location where the radio signals to the base unit 100 are blocked, subscriber unit 107 may be assigned a sub-channel for talk around purposes. In such a situation, the OFDMA system assigns subscriber unit 107 to a sub-channel and a talk time slot that do not interfere with another subscriber unit in the OFDMA system. As such, the method for providing talk around, as described above and with reference to FIGS. 1-5, can be extended to an OFDMA system where sub-channels of time slots are used for communication.

Further, as described, such an OFDMA system may be applied to other frequency bands, e.g. an embodiment of the present invention may be applied to a 700 MHz frequency communication system.

Thus, the present invention fulfills a need in the prior art for providing a communication trunking system which has the feature of talk around without requiring separate OFDMA time slots and/or sub-channels for the talk around users. The present invention further fulfills a need in the prior art by providing control of transmission powers of talk around users such that system integrity is not degraded and by preventing interference of the talk around user with other network users.

The present invention is not limited to the particular details or the apparatus depicted and other modifications and applications are contemplated. Certain other changes may be made in the above-described apparatus without departing from the true spirit and scope of the invention herein involved. For example, the present invention can be used with any orthogonal frequency division multiple access system, such as 800 MHz systems wherein it is desirable to have the talk around user assigned a talk time slot and a sub-channel in common with network users. It is intended, therefore, that the subject matter in the above depiction shall be interpreted as illustrative and not in a limiting sense.

What is claimed is:

1. A method for providing talk around in an OFDMA communication system comprised of OFDMA time slots, wherein each OFDMA time slot is subdivided into a plurality of sub-channels, comprising the steps of:

sending a talk around request from a subscriber unit to a base unit;

acknowledging the request at the base unit and sending a signal from the base unit to the subscriber unit;

determining at the subscriber unit a RSSI (received signal strength indication) of the signal received from the base unit;

sending the RSSI from the subscriber unit to the base unit;

comparing in the base unit the RSSI to a predetermined window:

(a) denying, if the RSSI is above the window, the request from the subscriber unit, the subscriber unit thereby not going into a talk around mode;

(b) assigning, if the RSSI is within the window, (i) a sub-channel of the OFDMA communication system and (ii) a power level to the subscriber unit, the subscriber unit thereby going into talk around mode; and (c) not responding, if the RSSI is below the window, to the subscriber unit, the subscriber unit thereby going into a direct communication mode.

2. The method according to claim 1, wherein the OFDM communication system has a predetermined number of OFDMA time slots wherein at least one of the plurality of sub-channels comprises a talk time slot.

3. The method according to claim 1, wherein each sub-channel comprises a 6.25 kHz bandwidth.

4. The method according to claim 1, wherein one of the OFDMA time slots is a control time slot.

5. The method according to claim 1, wherein the OFDMA communication system has a plurality of network subscriber units, and wherein the power level assigned to the talk around subscriber is at a level reduced from a power level of a network subscriber unit using the assigned channel of the talk around subscriber unit such that the talk around subscriber unit does not substantially interfere with the network subscriber unit.

6. The method according to claim 1, wherein in talk around mode the subscriber unit is assigned a sub-channel of an OFDMA time slot that minimizes interference with other subscriber units in the OFDMA communication system.

7. The method according to claim 1, wherein in talk around mode the subscriber unit is assigned an OFDMA time slot that minimizes interference with other subscriber units in the OFDMA communication system.

8. The method according to claim 1, wherein in talk around mode the subscriber unit is assigned a power level that minimizes interference with other subscriber units in the OFDMA communication system.

9. A method for preserving system integrity in an OFDMA communication network having a trunk composed of a plurality of OFDMA time slots, wherein each OFDMA time slot is subdivided into a plurality of sub-channels and the OFDMA communication network including a base unit and a plurality of subscriber units, comprising the steps of:

sending a talk around request from a first subscriber unit of the plurality of subscriber units to the base unit;

acknowledging the request at the base unit and sending a signal from the base unit to the first subscriber unit;

determining at the first subscriber unit a RSSI (received signal strength indication) of the signal received from the base unit;

sending the RSSI from the first subscriber unit to the base unit;

comparing in the base unit the RSSI to a predetermined window:

(a) denying, if the RSSI is above the window, the request from the first subscriber unit, the first subscriber unit thereby not going into a talk around mode;

(b) assigning, if the RSSI is within the window, the first subscriber unit to a sub-channel for talk around which is spaced apart from other sub-channels for talk, and controlling a power level to the first subscriber unit to minimize interference to the network by the first subscriber unit being in talk around mode, the first subscriber unit thereby going into a talk around mode; and (c) not responding, if the RSSI is below the window, to the first subscriber unit, the first subscriber unit thereby going into a direct communication mode independent of the communication network.

10. The method according to claim 9, wherein each sub-channel comprises a 6.25 kHz bandwidth.

* * * * *